July 16, 1963     C. E. JOHNSON     3,097,468
GRASS CUTTER BAR
Filed Jan. 16, 1962
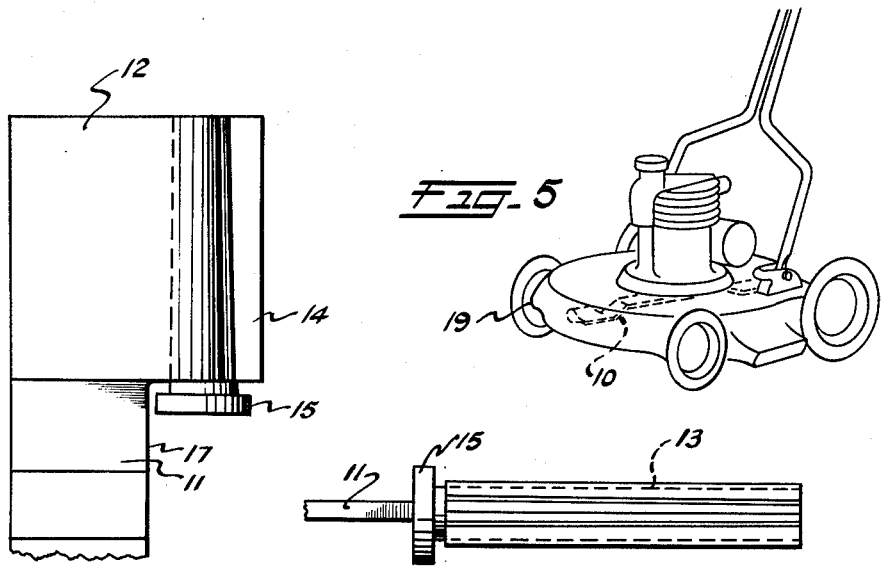
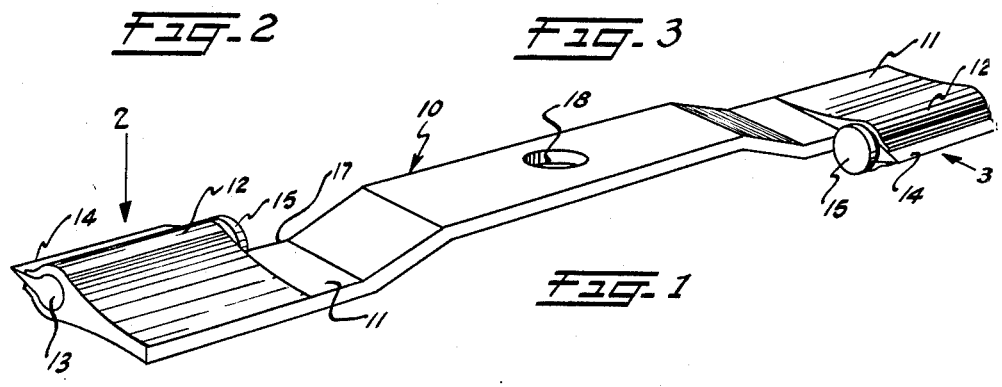
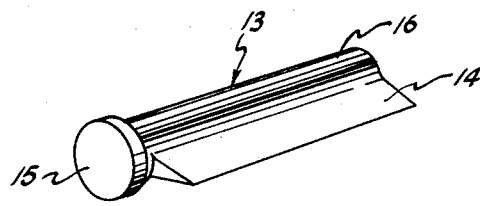
INVENTOR
CLARENCE E. JOHNSON

United States Patent Office 3,097,468
Patented July 16, 1963

3,097,468
GRASS CUTTER BAR
Clarence E. Johnson, Rte. 4, Box 100A, Arkadelphia, Ark.
Filed Jan. 16, 1962, Ser. No. 166,519
1 Claim. (Cl. 56—295)

This invention relates to lawn mowers of the rotary type and the like and more particularly to that part of the lawn mower known in the art as a cutter bar.

One of the main objections to the rotary type of lawn mower is the difficulty one experiences in getting to the blade to sharpen it. While the purpose in making the blade difficult to reach is appreciated since it is obvious that it is for reasons of safety, the average person feels that this objective has been over-stressed and the necessity of one having to sharpen the cutter blade from time to time completely forgotten.

It is therefore an object of this present invention to provide a grass cutter bar for lawn mowers of the rotary type that can be removed for sharpening in a minimum of time by reasons that will become more apparent as this description proceeds.

Another object of this invention is to provide a grass cutter bar of the character described that is in three separate pieces, one of which remains secured to the lawn mower at all times and two easily removed cutters.

Another object of this invention is to provide a grass cutter bar of the character described that has two separate cutters that are held in place by the centrifugal force when the lawn mower to which it is attached is in motion.

Another object of this invention is to provide a grass cutter bar of the character described that can be installed on any rotary type of lawn mower by even the most inexperienced person in the art of assembling lawn mowers and the like.

Another object of this invention is to provide a grass cutter bar of the character described that can be secured to any rotary type of lawn mower whether it is hand, internal combustion engine, or electric powered.

Another object of this invention is to provide a grass cutter blade of the character described that can have its two cutting edges replaced when necessary without the use of any tool whatsoever.

Another object of this invention is to provide a grass cutter blade of the character described that can be manufactured and retailed at a price well within the reach of every lawn mower owner.

Another object of this invention is to provide a grass cutter blade of the character described that can be manufactured in any desired size.

Another object of this invention is to provide a grass cutter bar of the character described that can be put up and retailed in kit form as a replacement part for any rotary type of lawn mower now on the market.

Still another object of this invention is to provide a grass cutter bar of the character described that can readily be removed and sharpened with tools found in nearly every household.

Other and further objects and advantages of this unique grass cutter bar will be hereinafter described, and the novel features thereof defined in the appended claim.

Referring to the drawing:
FIGURE 1 is a pictorial view of this invention ready for installation on a rotary type of lawn mower;
FIGURE 2 is a top view of one portion of this invention as indicated by the arrow and numeral 2 in FIGURE 1;
FIGURE 3 is a side view of one portion of this invention as indicated by the arrow and numeral 3 in FIGURE 1.
FIGURE 4 is a pictorial view of one of the removable cutters of this invention.
FIGURE 5 is a pictorial view of a typical power lawn mower of the rotary type showing this invention in phantom lines.

Similar reference characters refer to similar parts throughout the several views of the drawings.

Having reference now to the drawing in detail, there is generally indicated by the character 10 a grass cutter bar having depressed ends 11 that are rectangular in plan form and terminate in a raised rectangular portion 12 that has a combined tubular and slotted opening therein for the slidable reception of cutter 13 that is rectangular in plan form and has a cutting edge 14 which is triangular when viewed from the end. A dish-like head 15 is formed on one end of the said cutter which has a rounded trailing edge 16 adapted to slidably fit into the aforesaid opening in the raised rectangular portion 12 of this invention.

It will be clearly seen from examination of FIGURE 2 of the appended drawing that the raised rectangular portion 12 of the cutter bar 10 extends beyond one side 17 of the said cutter bar 10 in order to provide space for the said dish-like head 15 of the cutter 13 which is in a reversed location on the other end of the said cutter bar 10. The cutter bar 10 is provided with a centrally located opening 18 provided on the cutter bar 10 for its reception on the end of the power providing shaft of a lawn mower 19.

As many embodiments may be made of this inventive concept, and as many modifications may be made in the embodiment hereinbefore shown and described, it will be understood that all matter herein is to be interpreted merely as illustrative, and not in a limiting sense.

What I now claim as my invention and desire to secure by Letters Patent is:

A grass cutter bar of the character described, the said bar being rectangular as viewed from the top and having depressed ends that are parallel to the center section and a raised portion on each end thereof, the said raised portion also being rectangular as viewed from the top, and each said raised portion being integral with the rest of the said bar, and the each said raised portion of the said cutter bar having a longitudinally disposed opening therein, the opening having an end view configuration that is basically that of a letter U, and a cutter having the end viewed configuration of a letter U terminating in an equilateral triangle that is rectangular when viewed from the top, the said cutter having one end of its raised portion terminating in a head having the configuration of a disk, and each said cutter having its raised portion slidably secured within the U-shaped opening of the said raised portion of the said cutter bar, the said cutter bar having a centrally located opening thereby providing means for mounting the said cutter bar on the power providing shaft of a lawn mower.

References Cited in the file of this patent

UNITED STATES PATENTS

| | | |
|---|---|---|
| 2,592,755 | Soenksen | Apr. 15, 1952 |
| 2,869,311 | Beeston | Jan. 20, 1959 |